(12) United States Patent
Kida et al.

(10) Patent No.: US 7,394,932 B2
(45) Date of Patent: Jul. 1, 2008

(54) VIDEO SIGNAL PROCESSOR AND METHOD OF PROCESSING VIDEO SIGNAL

(75) Inventors: Shingo Kida, Kawasaki (JP); Tomoaki Uchida, Noda (JP)

(73) Assignee: Victor Company of Japan, Ltd., Kanagawa-Ken (JP)

(*) Notice: Subject to any disclaimer, the term of this patent is extended or adjusted under 35 U.S.C. 154(b) by 680 days.

(21) Appl. No.: 10/967,269

(22) Filed: Oct. 19, 2004

(65) Prior Publication Data

US 2005/0163372 A1    Jul. 28, 2005

(30) Foreign Application Priority Data

Jan. 28, 2004    (JP) .............................. 2004-019424

(51) Int. Cl.
*G06K 9/00* (2006.01)
*G06K 9/40* (2006.01)
*G03F 3/08* (2006.01)

(52) U.S. Cl. .................... 382/169; 382/274; 358/522

(58) Field of Classification Search ................ 382/162, 382/167, 169, 274, 275; 348/362, 663, 671, 348/672; 358/519, 521, 522, 518; 345/690
See application file for complete search history.

(56) References Cited

U.S. PATENT DOCUMENTS

| 5,294,986 | A | * | 3/1994 | Tsuji et al. ................... 348/672 |
| 5,359,369 | A | * | 10/1994 | Izawa et al. ................. 348/672 |
| 5,477,345 | A | * | 12/1995 | Tse ............................. 358/500 |
| 5,517,333 | A | * | 5/1996 | Tamura et al. ............... 358/518 |
| 6,101,271 | A | * | 8/2000 | Yamashita et al. .......... 382/167 |
| 6,529,211 | B2 | * | 3/2003 | Ohara et al. ................. 345/690 |
| 6,583,820 | B1 | * | 6/2003 | Hung ......................... 348/362 |
| 6,738,510 | B2 | * | 5/2004 | Tsuruoka et al. ............ 382/167 |
| 6,825,884 | B1 | * | 11/2004 | Horiuchi ..................... 348/362 |
| 7,167,597 | B2 | * | 1/2007 | Matsushima ................ 382/274 |
| 7,242,763 | B2 | * | 7/2007 | Etter ..................... 379/406.14 |

FOREIGN PATENT DOCUMENTS

| JP | 05-191824 | 7/1993 |
| JP | 06-253176 | 9/1994 |
| JP | 07-281633 | 10/1995 |
| JP | 10-126647 | 5/1998 |
| JP | 2000-307896 | 11/2000 |
| JP | 2002-027285 | 1/2002 |
| JP | 2003-304417 | 10/2003 |

\* cited by examiner

*Primary Examiner*—Kanjibhai Patel
(74) *Attorney, Agent, or Firm*—Jacobson Holman PLLC

(57) ABSTRACT

An input video signal is corrected based on a gradation correction curve. Generated first is histogram data which indicates distribution of each of a plurality of levels at which a luminance signal component of the input video signal is divided from the lowest to the highest luminance level per specific unit of image. Produced next is at least a first gain based on the distribution of the histogram data. At least the first gain and the histogram data are processed to produce a plural number of data for a gradation correction curve. The gradation correction curve is generated based on the plural number of data. The input video signal is then corrected based on the gradation correction curve.

16 Claims, 7 Drawing Sheets

VIDEO SIGNAL PROCESSOR AND METHOD OF PROCESSING VIDEO SIGNAL

BACKGROUND OF THE INVENTION

The present invention relates to a video signal processor and a method of processing video signals.

Video signals are processed with gamma characteristics before broadcast to display apparatus having cathode ray tubes (CRT). CRT display apparatus process these video signals with reverse gamma characteristics to display images with linear gradation.

Different from CRT display apparatus, plasma display panels (PDP) and liquid crystal display (LCD) apparatus, both types having linear gradation, apply gamma correction to video signals processed with gamma characteristics to process the signals with reverse gamma characteristics for displaying images with linear gradation.

Not only achieving linear gradation, gamma correction is applied to video signals to make corrections to gamma curves constituted by input luminance signals Y-IN and output luminance signals Y-OUT in image-quality adjustments.

One example of a gamma curve for image-quality adjustments is called an S-curve such as shown in FIG. 1. D.C. components may be added (characteristics "a") to or subtracted (characteristics "b") from the S-curve, as shown in FIG. 2, to control brightness of black or white in gradation adjustments. The characteristics shown in FIGS. 1 and 2 may be combined, if necessary.

Japanese Unexamined Patent Publication No. 2002-27285 discloses gradation correction with no suppression of gain and gamma curve in spite of the scale of dynamic range.

In known video signal processing with gamma correction, however, a gamma curve is a predetermined fixed curve. In contrast, images carried by video signals vary with time. Thus, correction with such a fixed gamma curve cannot offer optimum image quality constantly.

SUMMARY OF THE INVENTION

A purpose of the present invention is to provide a video signal processor and a method of processing video signals with optimum image-quality adjustments in accordance with the condition of video signals.

The present invention provides an apparatus for processing an input video signal comprising: a generator to generate histogram data which indicates distribution of each of a plurality of levels at which a luminance signal component of the input video signal is divided from the lowest to the highest luminance level per specific unit of image; a producer to produce at least a first gain based on the distribution of the histogram data; a processor to process at least the first gain and the histogram data to produce a plural number of data for a gradation correction curve; and a gradation corrector to generate the gradation correction curve based on the plural number of data and correct the input video signal based on the gradation correction curve.

Moreover, the present invention provides a method of processing an input video signal comprising the steps of: generating histogram data which indicates distribution of each of a plurality of levels at which a luminance signal component of the input video signal is divided from the lowest to the highest luminance level per specific unit of image; producing at least a first gain based on the distribution of the histogram data; processing at least the first gain and the histogram data to produce a plural number of data for a gradation correction curve; generating the gradation correction curve based on the plural number of data; and correcting the input video signal based on the gradation correction curve.

DETAILED DESCRIPTION OF PREFERRED EMBODIMENT

An embodiment and several modifications according to the present invention will be disclosed with reference to the attached drawings.

Embodiment

Figure 1:
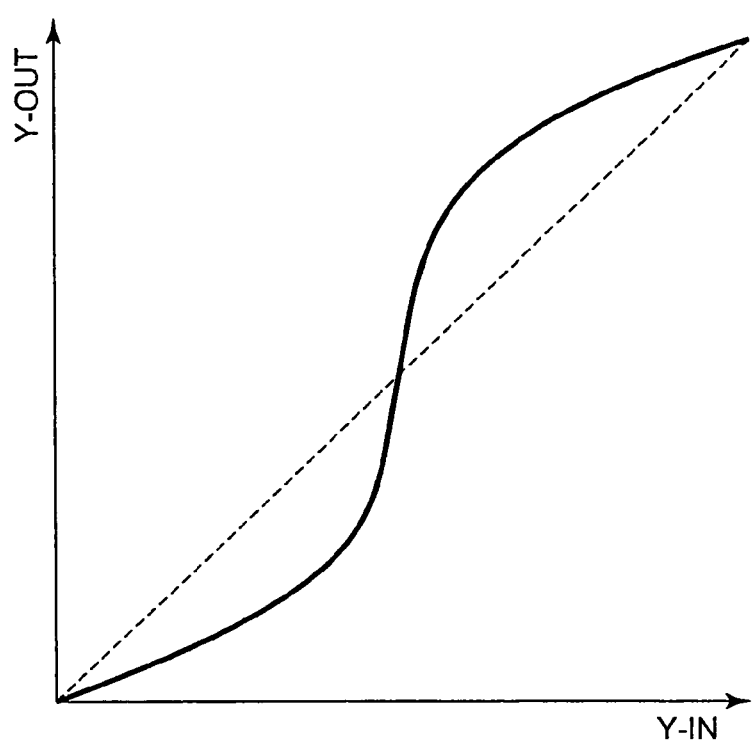
FIG. 1 shows a known gradation correction curve.
Figure 2:
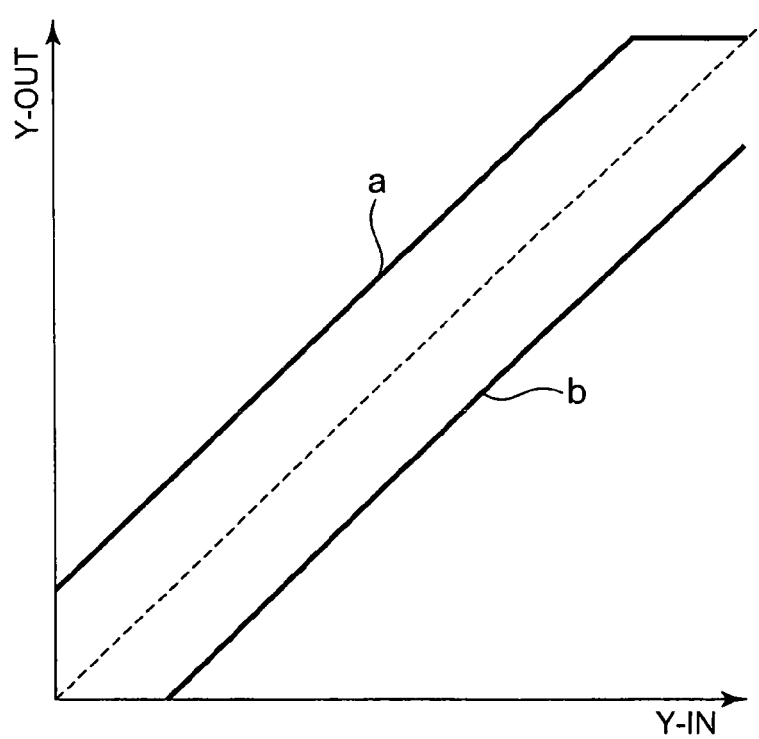
FIG. 2 shows another known gradation correction curve.
Figure 3:
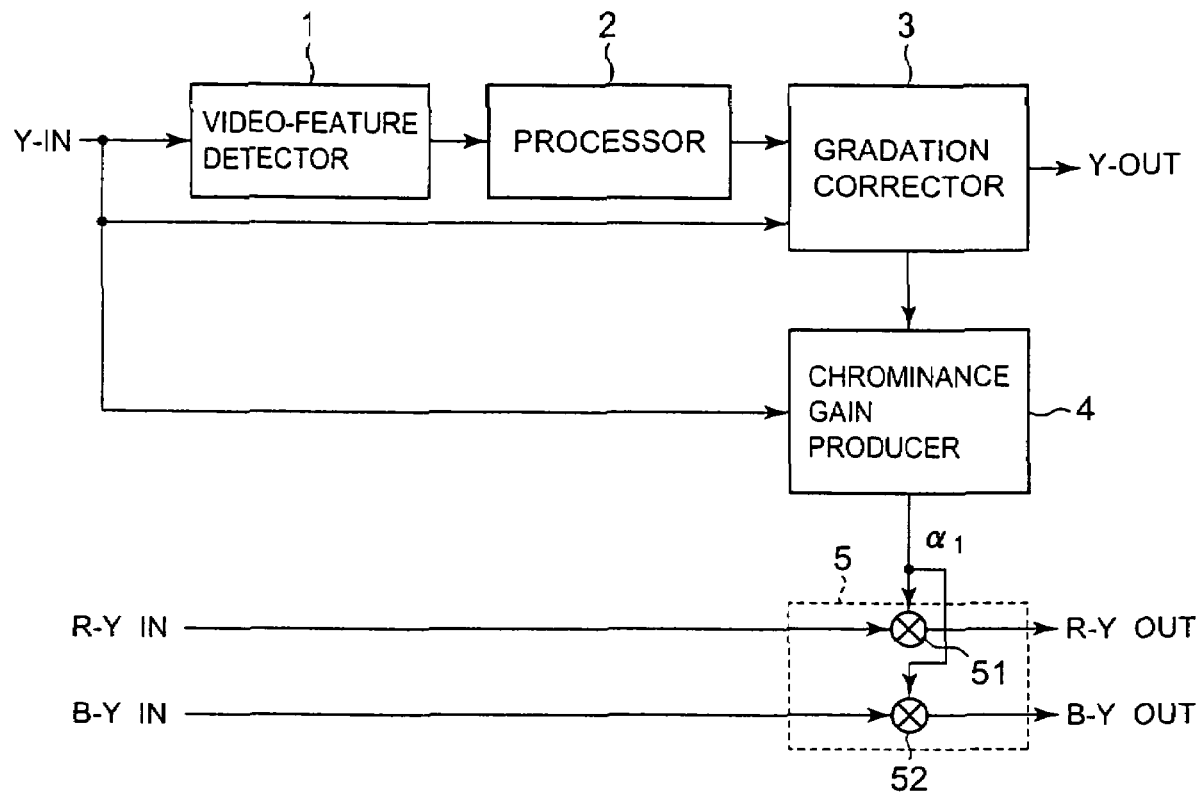
FIG. 3 shows a block diagram of an embodiment of a video signal processor according to the present invention.

Shown in FIG. 3 is a block diagram of an embodiment of a video signal processor according to the present invention.

A luminance signal component (Y-IN) of an input video signal is supplied to a video-feature detector (histogram generator) 1. The input video signal may be an interlaced or a progressive signal.

Figure 4:
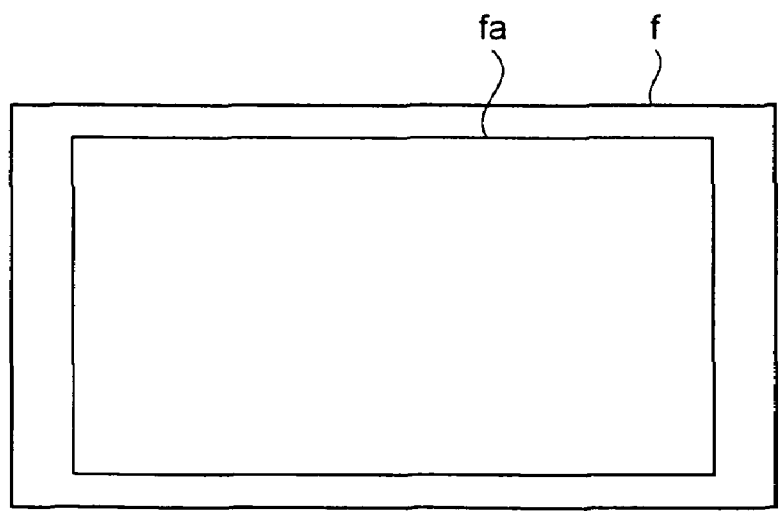
FIG. 4 illustrates a judging zone "fa" in a picture plane "f" according to the present invention.

The video-feature detector 1 has a judging zone "fa" in a picture plane "f" which is one field or one frame, as illustrated in FIG. 4. It generates histogram data based on luminance levels in the judging zone "fa" and also obtains average luminance APL in this zone.

Histogram data is generated per field or frame in this embodiment. It may, however, be generated per plural number of fields or frames. In other words, one requirement for histogram data is that it is generated per specific unit (duration) of image plane. It is, however, optimum to generate histogram data per field or frame.

Moreover, the same judging zone "fa" is used in generation of histogram data and also obtaining average luminance APL in this embodiment. This is optimum, however, different judging zones may be used. The zone "fa" can have any size within an effective duration of image plane.

In this embodiment, the input luminance signal component (Y-IN) is a 256-gradation (8-bit) signal. The upper 4 bits of this signal is used for generating histogram data H[i] (i=0 to 15) at 16 levels (the number of distribution).

In other words, in this invention, histogram data is generated which indicates distribution of each of a plurality of levels at which a luminance signal component of an input signal is divided from the lowest to the highest luminance level per specific unit of image.

Figure 5A:
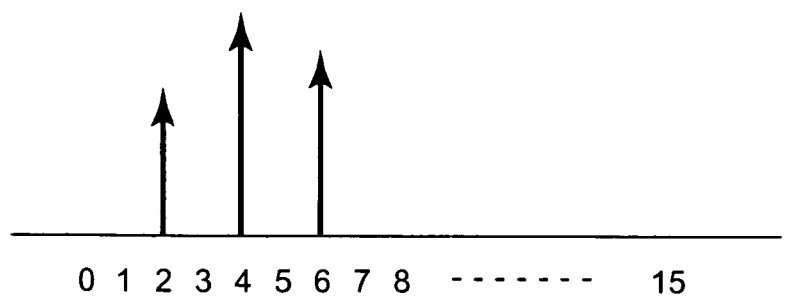
FIG. 5A illustrates exemplary histogram data.
Figure 5B:
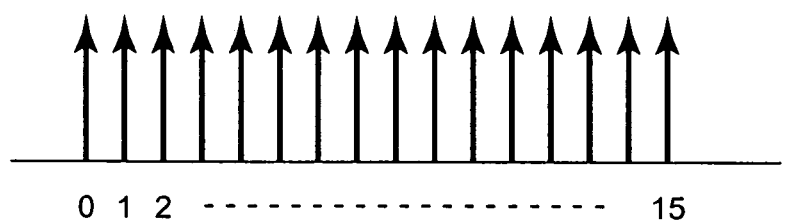
FIG. 5B illustrates other exemplary histogram data.

The histogram data H[i] shows different expansion modes, such as, illustrated in FIGS. 5A and 5B, depending on the types of images. FIG. 5A illustrates exemplary histogram data with a narrow distribution pattern at several luminance levels for images, for example, on personal computers. In contrast FIG. 5B illustrates exemplary histogram data for ordinary or natural images, with constant distribution of 16 pieces of histogram data.

The difference in expansion of distribution of histogram data H[i] is defined as expansion coefficient expCoef and calculated as follows:

$$\text{expCoef} = \left\{ H[0] \times H[1] + \sum_{i=1}^{i=14} H[i] \times \frac{1}{\min(H[i-1], H[i+1])} \right\} \times 40 / H\max / H\max \quad (1)$$

wherein Hmax is the highest level of H[i] (i=0 to 15).

The expansion coefficient expCoef is 0 for an image with distribution, such as shown in FIG. 5A, according to the equation (1). It is, however, 600 for an image with constant distribution, such as shown in FIG. 5B, according to the equation (1). The expansion coefficient expCoef takes any level in the range from 0 to 600.

The histogram data H[i], average luminance APL and expansion coefficient expCoef obtained by the video-feature detector 1 is supplied to a processor 2 shown in FIG. 3.

The processor 2 produces several gains, which will be disclosed later, based on the histogram data H[i], average luminance and expansion coefficient expCoef given for each image plane "f" (FIG. 4).

It is preferable to not make video (image quality) adjustments to images, for example, on personal computers, with narrow distribution of luminance at particular levels, such as shown in FIG. 5A.

On the contrary, it is preferable to make video adjustments to natural images with constant luminance distribution, such as shown in FIG. 5B.

Under consideration of these factors, the processor 2 firstly produces expansion gain Gexp based on the expansion coefficient expCoef.

Figure 6:
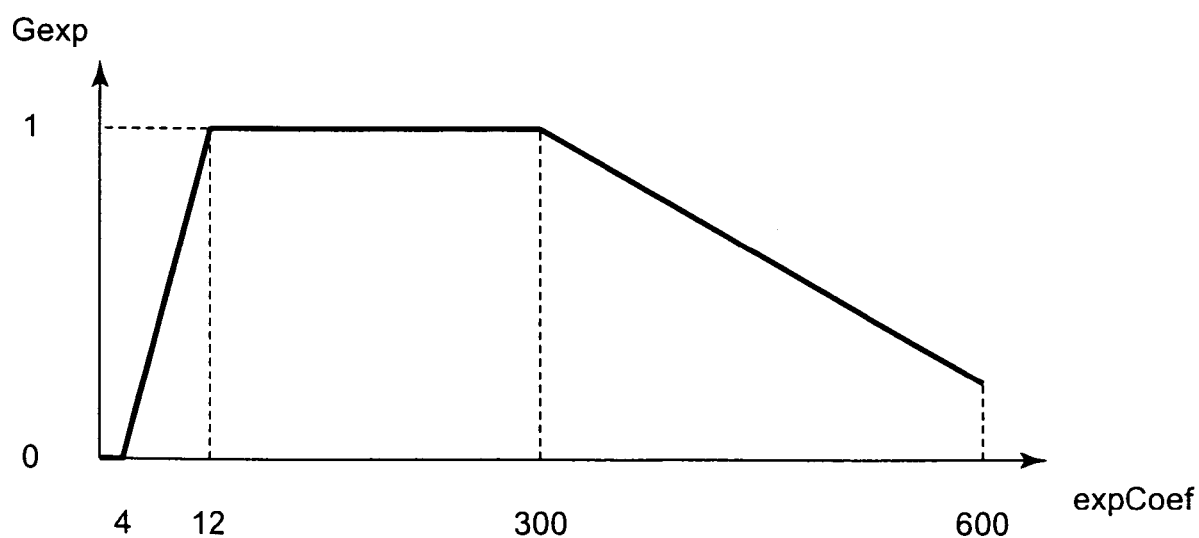
FIG. 6 shows exemplary expansion gain according to the present invention.

FIG. 6 shows exemplary expansion gain Gexp (the axis of ordinate) based on the expansion coefficient expCoef (the axis of abscissas).

The exemplary expansion gain Gexp exhibits the following characteristics: 0 in an extremely smaller range from 0 to 4 for the expansion coefficient expCoef; increase in a range from 4 to 12; 1 (the highest level) in an intermediate range from 12 to 300; and decrease in a larger range from 300 to 600.

The exemplary expansion gain Gexp shown in FIG. 6 varies at 4, 12 and 300 (transition points) for the expansion coefficient expCoef in this embodiment. The transition points may, however, be set freely. Moreover, the gain Gexp may not be 0 in the range from 0 to 4 for the coefficient expCoef in this embodiment.

The processor 2 (FIG. 3) then produces average luminance gain Gapl based on the average luminance APL.

Figure 7:
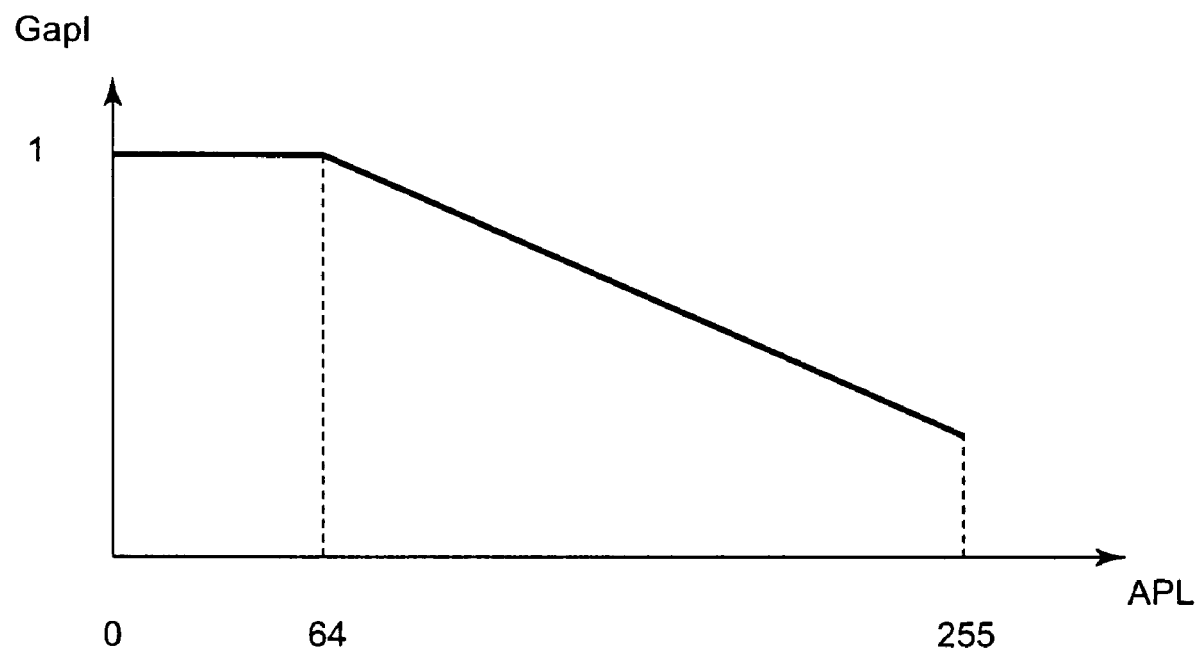
FIG. 7 shows exemplary average luminance according to the present invention.

FIG. 7 shows exemplary average luminance gain Gapl (the axis of ordinate) based on the average luminance APL (the axis of abscissas).

The exemplary luminance gain Gapl exhibits the following characteristics: 1 (the highest level) in a lower range from 0 to 64 for the average luminance APL; and decrease in intermediate and higher ranges from 64 to 255. It begins to decrease at APL 64 and decreases at a certain rate, as shown in FIG. 7, in this embodiment. The decrease starting point and decreasing rate may, however, be set freely.

The exemplary characteristics Gapl shown in FIG. 7 is given under consideration of a relatively unacceptable phenomenon in which, in general, when average luminance APL is relatively high, the gamma characteristics exhibits a steep gradient at higher APL whereas a gentle gradient at relatively lower APL, with a low luminance signal becoming further lower (darker).

The processor 2 (FIG. 3) also produces weighting gain Gw for the histogram data H[0] to H[15] obtained as disclosed above.

Figure 8:
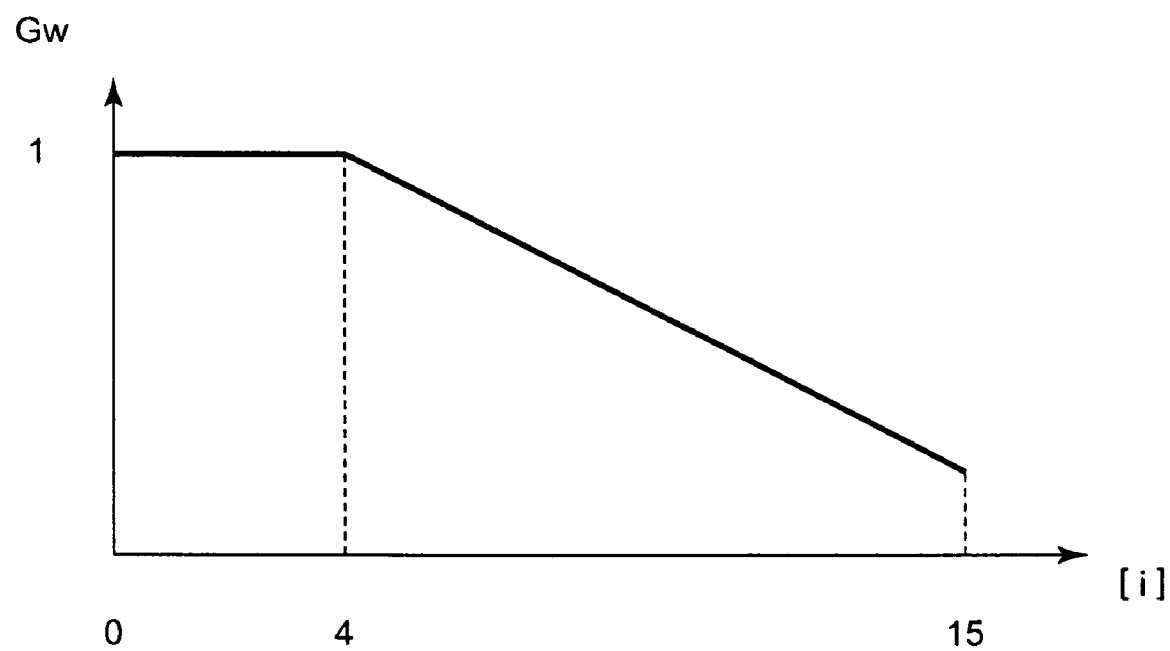
FIG. 8 shows exemplary weighting gain according to the present invention.

FIG. 8 shows exemplary weighting gain Gw (the axis of ordinate) based on index "i" of histogram data H[i] (the axis of abscissas).

The exemplary weighting gain Gw exhibits the following characteristics: 1 (the highest level) in a smaller range from 0 to 4 for the index "i" of histogram data H[i]; and decrease in intermediate and larger ranges from 5 to 15.

The exemplary characteristics Gw shown in FIG. 8 is given for the same reason as for the exemplary characteristics Gapl shown in FIG. 7, as discussed above. It begins to decrease at i=4 and decreases at a certain rate, as shown in FIG. 8, in this embodiment. The decrease starting point and decreasing rate may, however, be set freely.

As discussed, one requirement for both average luminance gain Gapl and weighting gain Gw is that the gains start to decrease at a certain luminance level or higher.

Figure 9:
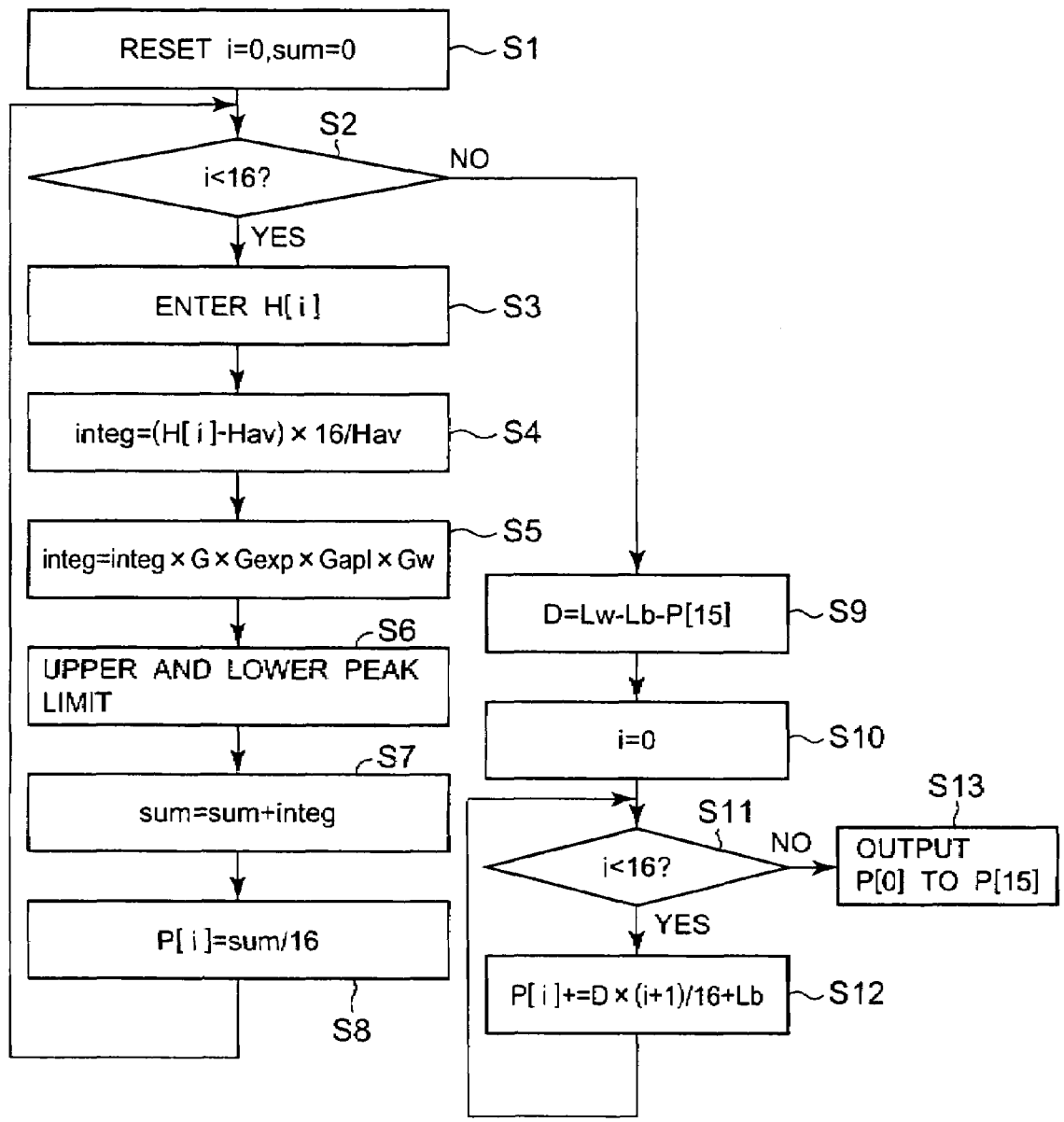
FIG. 9 shows a flowchart indicating production of point data that constitute a gradation correction curve according to the present invention.

Next, the processor 2 performs integration of histogram with the histogram data H[i] and the gains Gexp, Gapl and Gw, as shown in FIG. 9.

A flowchart shown in FIG. 9 indicates integration of histogram to obtain point data P[i] that constitute a gradation correction curve (gamma curve) for correcting gradation of the luminance signal component Y-IN of the input video signal.

In step S1, the processor 2 resets the index "i" to 0 and also the integral value "sum" to 0 for P[i].

It is determined in step S2 whether the index "i" is smaller than 16. The process moves onto step S3 when "i" is smaller than 16 (YES) whereas jumps to step S9 when it is equal to or larger than 16 (NO).

Histogram data H[i] is entered in step S3. It is H[0] because i=0.

The histogram data H[i] entered in step S3 is offset with an average value Hav of H[i] (i=0 to 15) according to an equation (2) shown below:

$$integ = (H[i] - Hav) \times 16 / Hav \quad (2)$$

The value "integ" calculated in step S4 is an offset value. The average value Hav may be obtained by adaptive correction with average luminance or expansion coefficient.

Next in step S5, the offset value "integ" calculated in step S4 is multiplied by the expansion gain Gexp, average luminance gain Gapl and weighting gain Gw obtained with reference to FIGS. 6 to 8 and also a given fixed gain G previously set at the processor 2, according to an equation (3) shown below:

$$integ = integ \times G \times Gexp \times Gapl \times Gw \quad (3)$$

Peak limiting processing is applied, in step S6, to data obtained in step S5 using upper and lower reference peak levels.

The peak-limited data obtained in step 56 is then added to the integral value "sum" at P[i] in step S7 (sum=sum+integ). The newly obtained integral value "sum" is equal to the peak-limited data because i=0, thus sum=0.

Point data P[i] is obtained, in step S8, for the histogram data H[i] by using the integral value "sum" obtained in step S7, according to an equation (4) shown below:

$$P[i]=sum/16 \quad (4)$$

The point data P[i] is temporarily stored in a memory (not shown) of the processor 2.

The index "i" is increased by 1 on completion of step 58, and the process returns to step S2. Steps S2 to S8 are repeated until the index "i" reaches 15.

Figure 10:
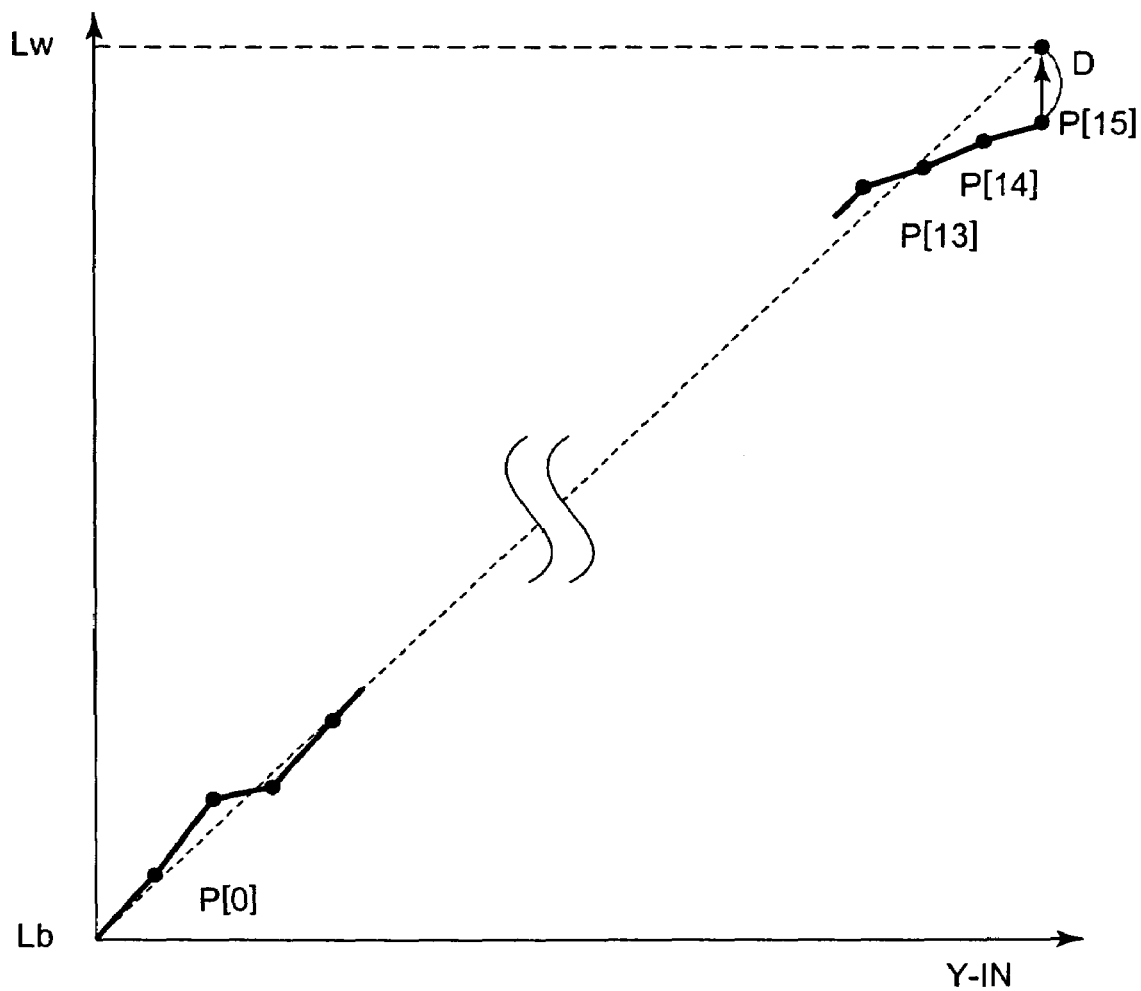
FIG. 10 illustrates production of a gradation correction curve according to the present invention.

The above processing produces point data P[0] to P[15] that constitute a gradation correction curve, shown in FIG. 10, with input luminance signal component Y-IN (the axis of abscissas) and output luminance signal component Y-OUT (the axis of ordinate).

In FIG. 9, the index "i" reaches 16 when point data P [15] is given in step S8. The process returns to step S2 and determines whether the index "i" is smaller than 16. The process moves onto step S9 if it is determined that the index "i" is equal to or larger than 16 (NO).

In step S9, a difference D (shown in FIG. 10) between a predetermined white level Lw and the present white level (P[15]) is given according to an equation (5) shown below:

$$D=Lw-Lb-P[15] \quad (5)$$

where Lb is a predetermined black level.

The black level Lb is set to 0 in this embodiment, thus the equation (5) is given as follows:

$$D=Lw-P[15] \quad (5)'$$

The present white level is then corrected so that it becomes equal to the predetermined white level Lw based on the difference D.

The index "i" is reset again to 0 in step S10. It is determined in step S11 whether the index "i" is smaller than 16. The process moves onto step S12 when "i" is smaller than 16 (YES) whereas to step S13 when it is equal to or larger than 16 (NO).

Correction is performed, in step S12, according to an equation (6) shown below to make corrections to the white level at each point P[i] in accordance with the difference D given in order to correct the present white level to the predetermined white level Lw. Each white-level-corrected point data P[i] is temporarily stored in a memory (not shown) of the processor 2.

$$P[i]=D\times(i+1)/16+Lb \quad (6)$$

The index "i" is increased by 1 on completion of step S12, and the process returns to step S11. Step S12 is repeated until the index "i" reaches 15.

The index "i" becomes 16 when the point data P[15] is corrected in step S12. It is then determined that the index "i" is not smaller than (or it is equal to or larger than) 16 (NO), and the process moves onto step S13.

In step S13, the processor 2 outputs new white-level-corrected point data P[0] to P[15] to a gradation corrector 3 shown in FIG. 3. Strictly, the point data P[0] to P[15] produced in step S13 via step S12 are different from the point data P[0] to P[15] produced in step S8 and shown in FIG. 10. The same reference signs are, however, given to both point data produced in steps S8 and S13, for convenience.

As disclosed above, the processor 2 acts as a gain producer to produce several gains, such as the expansion gain Gexp, average luminance gain Gapl and weighting gain Gw, based on distribution of the histogram data supplied by the video-feature detector 1. It further acts as a processor to process the gains and the histogram data supplied by the video-feature detector 1 to produce a plural number of point data that are used for constituting a gradation correction curve, as disclosed below.

The gradation corrector 3 applies linear interpolation to the point data P[i] (i=0 to 15) supplied by the processor, as illustrated in FIG. 10, to generate a gradation correction curve. According to the gradation correction curve, the gradation corrector 3 corrects gradation of the input luminance signal component Y-IN and outputs the corrected signal as the output luminance signal component Y-OUT. The output luminance signal component may be supplied to a display apparatus (not shown).

In this embodiment, the gradation correction (gamma) curve automatically generated per picture plane "f" (FIG. 4) is used in correction of input luminance components of a video signal, as disclosed above.

The gradation correction curve generated in this embodiment offers higher image quality than the known fixed gradation correction curve.

Obtained in this embodiment are three gains: expansion gain Gexp, average luminance gain Gapl and weighting gain Gw. The present invention can, however, offer high image quality only with the expansion gain Gexp depending on desired quality. The combination of the expansion gain Gexp and the average luminance gain Gapl or the weighting gain Gw can also offer high image quality depending on desired quality.

The video signal processing in this embodiment disclosed so far applies correction to luminance components only, thus achieving higher image quality but not yet optimum. This is because correction to luminance components only causes change in color tone.

Therefore, the embodiment further applies correction to chrominance signal components of a video signal to achieve higher image quality, as disclosed below.

In FIG. 3, the input luminance signal component Y-IN and the luminance signal component Y-OUT corrected by the gradation corrector 3 are supplied to a chrominance gain producer 4. When receiving the components Y-IN and Y-OUT, the producer 4 produces a chrominance gain a1 based on Y-OUT/Y-IN=a. The gain a1 may be equal or proportional to "a".

The chrominance gain a1 is then supplied to a multiplier 5 having multiplying units 51 and 52. The units 51 and 52 multiply the gain a1 by input chrominance difference signals R-Y IN and B-Y IN to output corrected chrominance difference signals R-Y OUT and B-Y OUT, respectively. Chrominance signal components to be corrected may be R (red), G (green) and B (blue).

Modification 1

Figure 11:
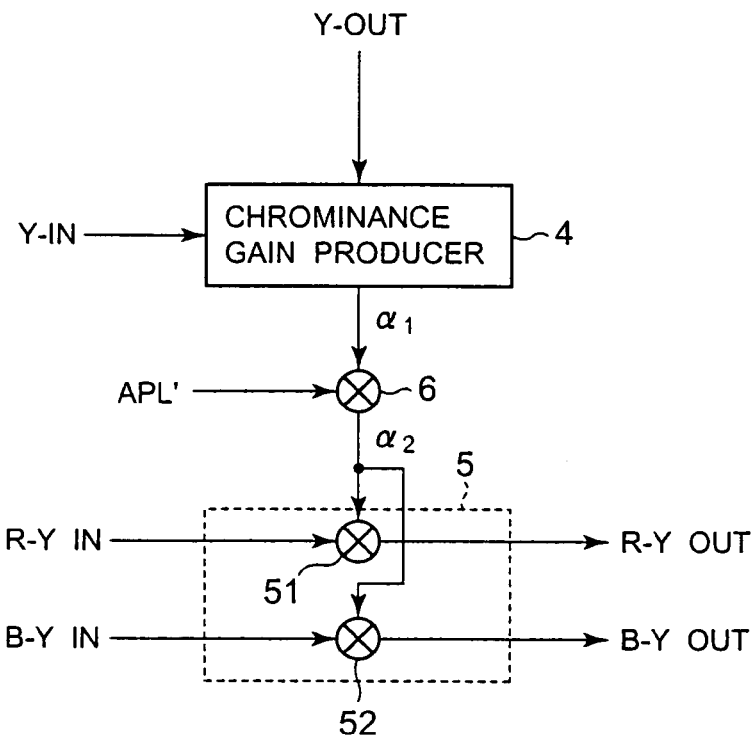
FIG. 11 shows a partial block diagram of a first modification to the embodiment (FIG. 3) according to the present invention.

Shown in FIG. 11 is a partial block diagram of a first modification to the embodiment (FIG. 3) according to the present invention. The circuit components identical to those in the embodiment are not shown in FIG. 11, except the chrominance gain producer 4, and the explanation of these components are omitted for brevity.

In FIG. 11, the chrominance gain a1 produced by the chrominance gain producer 4 is supplied to a multiplier 6 before the multiplier 5.

The multiplier 6 applies adaptive correction to the chrominance gain a1 in accordance with a coefficient APL' based on the average luminance APL or the absolute level of the input luminance signal component, to output a corrected chrominance gain a2.

The adaptively-corrected chrominance gain a2 is then supplied to the multiplier 5. The multiplying units 51 and 52 multiply the gain a2 by input chrominance difference signals R-Y IN and B-Y IN to output corrected chrominance difference signals R-Y OUT and B-Y OUT, respectively.

As disclosed, the modification 1 produces a chrominance gain in accordance with change in luminance with correction of chrominance signal components using the coefficient APL' based on the average luminance APL or the absolute level of the input luminance signal component, thus achieving higher image quality than the embodiment.

Modification 2

Figure 12:
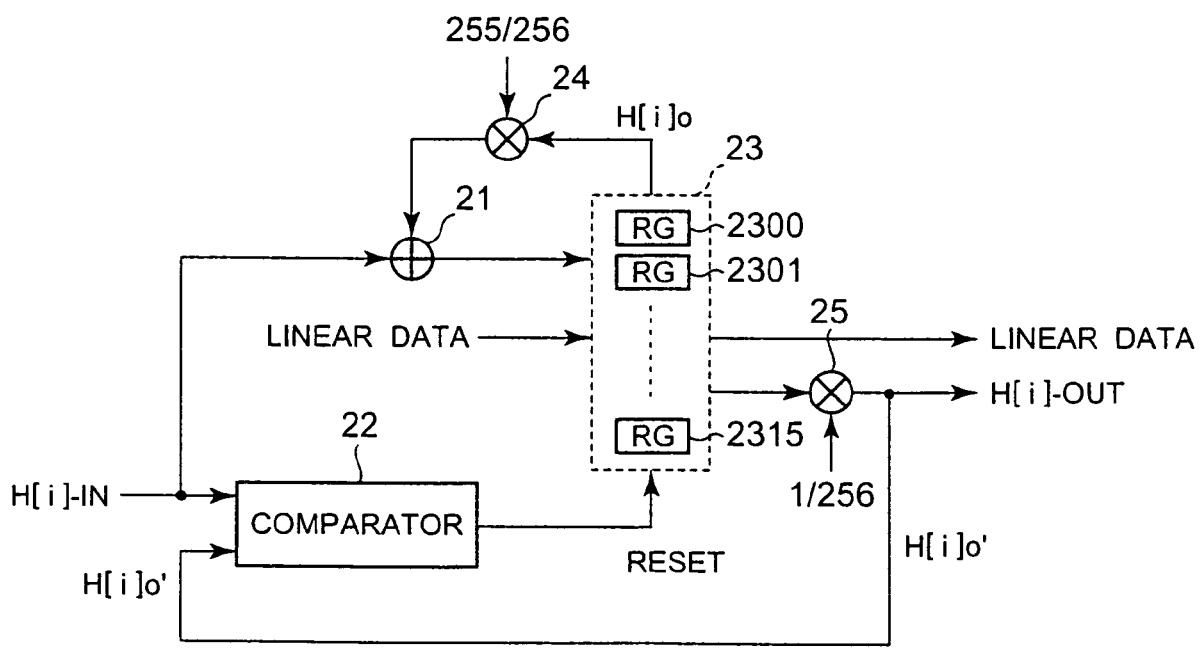
FIG. 12 shows a partial block diagram of a second modification to the embodiment (FIG. 3) according to the present invention.

Shown in FIG. 12 is a partial block diagram of a second modification to the embodiment (FIG. 3) according to the present invention. The circuit components identical to those in the embodiment are not shown in FIG. 12, and the explanation of these components are omitted for brevity.

Shown in FIG. 12 is a leak integrator for higher image quality than the embodiment, which is installed in the processor 2 (FIG. 3).

In detail, the modification 2 gives relatively moderate adjustments to histogram data for drastic change in images such as scene change.

The modification 2 achieves higher image quality than the embodiment with improvements in that displayed images could become unnatural due to significant change in a luminance signal component corrected by the gradation corrector 3 when histogram data varies significantly in response to drastic change in images such as scene change.

The modification 2 performs leak integration in the direction of time in adjustments to histogram data. As disclosed below in detail, a gradation correction curve is reset so that it is temporarily modified into a linear curve when histogram data exhibits significant change.

In the same way as the embodiment, histogram data H[i] (i=0 to 15) are generated at 16 levels (the number of distribution) from the judging zone "fa" in the picture plane "f" shown in FIG. 4.

In FIG. 12, the histogram data H[i] (i=0 to 15) are sequentially supplied (beginning from H[0]) to an adder 21 and also a comparator 22.

Also supplied to the adder 21 are data from a multiplier 24. The data are added to the histogram data H[i] (i=0 to 15) at the adder 21.

The histogram data H[i] (i=0 to 15) output from the adder 21 are sequentially supplied to 16 registers RG from RG 2300 to RG 2315 installed in a register unit 23.

The picture plane "f" (FIG. 4) is updated to the next scene, for example, in scene change, when all of the histogram data H[i] (i=0 to 15) have been supplied to the registers RG 2300 to RG 2315, beginning from H[0] to RG 2300 to H[15] to RG 2315.

New histogram data H[i] (i=0 to 15) are then generated at 16 levels from the judging zone "fa" in the updated picture plane "f", in the same way as disclosed above.

The new histogram data H[i] (i=0 to 15) are sequentially supplied (beginning from H[0]) to the adder 21 and also the comparator 22.

The histogram data H[i] generated from the pre-updated image plane "f" and already stored in the registers RG 2300 to RG 2315, now denoted as H[i]o, are output to the multiplier 24 and also to another multiplier 25.

The histogram data H[i]o are multiplied by 255/256 at the multiplier 24. The 255/256-multiplied histogram data H[i]o are then supplied to the adder 21 and added to the new histogram data H[i]. The histogram data H[i] (i=0 to 15) output from the adder 21 are sequentially supplied to the registers RG 2300 to RG 2315.

The histogram data H[i]o output to the multiplier 25 are multiplied by 1/256 and output as histogram data H[i]o'.

The factors 255/256 and 1/256 used in the multipliers 24 and 25, respectively, are given for the 256-gradation (8-bit) input luminance signal component Y-IN in the embodiment.

The histogram data H[i]o' are then supplied to the comparator 22. The histogram data H[i]o' and the histogram data H[i] newly supplied to the comparator 22 are compared to each other using, for example, an equation (7) shown below:

$$\sum_{0}^{15}(H[i]-H[i]o')^2 \qquad (7)$$

The resultant of the equation (7) is compared with a specific value set at the comparator 22.

When the resultant is smaller than the specific value, the histogram data H[i]o' (H[i]-OUT) output from the multiplier 25 are subjected to the integration processing (beginning from step S3 in FIG. 9).

In contrast, when the resultant is equal to or larger than the specific value, histogram data H[i] (i=0 to 15) that are linear data for constituting a linear gradation correction curve (such as illustrated as a dot line in FIG. 10) and prestored in the processor 2 are sent to the registers RG 2300 to RG 2315. Thus, the histogram data already stored in these registers are replaced with these linear data (RESET).

The linear data newly stored in the registers RG 2300 to RG 2315 are subjected to the integration processing (beginning from step S3 in FIG. 9).

The above processing is performed for every picture plane "f" shown in FIG. 4.

In the modification 2, the comparator 22 acts as a detector to detect the degree of change in histogram data H[i]. Moreover, the register unit 23 and the gradation corrector 3 (FIG. 3) act as a modifier to modify a gradation correction curve into a linear curve when the degree of change in histogram data H[i] corresponds to or larger than the specific value described above.

The modification 2 (with leak integration) thus achieves smooth image change and more natural image quality against drastic image changes such as scene change at which histogram data varies significantly.

The embodiment and the modifications 1 and 2 disclosed above can be achieved either by hardware or software. Moreover, any further modification can be applied to the present invention without departing from the scope of the invention.

What is claimed is:

1. An apparatus for processing an input video signal comprising:

a generator to generate histogram data which indicates distribution of each of a plurality of levels at which a luminance signal component of the input video signal is divided from the lowest to the highest luminance level per specific unit of image;

a producer to produce at least a first gain based on the distribution of the histogram data;

a processor to process at least the first gain and the histogram data to produce a plural number of data for a gradation correction curve;

a gradation corrector to generate the gradation correction curve based on the plural number of data and correct the input video signal based on the gradation correction curve;

a chrominance gain producer to produce a chrominance gain based on the input video signal and an output video signal of the gradation corrector; and a chrominance corrector to correct a chrominance signal component of the input video signal based on the chrominance gain.

2. The apparatus according to claim 1, wherein the producer further produces a second gain exhibiting characteristic that starts to decrease at a given luminance level or higher, the processor processing at least the first gain, the second gain and the histogram data to produce the plural number of data.

3. The apparatus according to claim 2, further comprising a detector to obtain average luminance for each of a specific unit of images based on the luminance signal component, the second gain being produced based on the average luminance.

4. The apparatus according to claim 1, further comprising a gain processor to apply adaptive correction to the chrominance gain based on average luminance, for each of a specific unit of images, obtained based on the luminance signal component or on the absolute level of the luminance signal component, to correct the chrominance gain, the chrominance signal component being corrected based on the corrected chrominance gain.

5. The apparatus according to claim 1, further comprising:

a detector to detect degree of change in the histogram data; and a modifier to modify the gradation correction curve into a linear curve when the degree of change corresponds to or is larger than a specific value.

6. A method of processing an input video signal comprising the steps of:

generating histogram data which indicates distribution of each of a plurality of levels at which a luminance signal component of the input video signal is divided from the lowest to the highest luminance level per specific unit of image;

producing at least a first gain based on the distribution of the histogram data;

processing at least the first gain and the histogram data to produce a plural number of data for a gradation correction curve;

generating the gradation correction curve based on the plural number of data;

correcting the input video signal based on the gradation correction curve;

producing a chrominance gain based on the input video signal and an output video signal of the gradation corrector; and correcting a chrominance signal component of the input video signal based on the chrominance gain.

7. The method according to claim 6, wherein the producing step includes the step of producing a second gain exhibiting characteristic that starts to decrease at a given luminance level or higher, the processor processing at least the first gain, the second gain and the histogram data to produce the plural number of data.

8. The method according to claim 7, wherein the generating step includes the step of obtaining average luminance for each of a specific unit of image based on the luminance signal component, the second gain being produced based on the average luminance.

9. The method according to claim 6, further comprising the step of applying adaptive correction to the chrominance gain based on average luminance, for each of a specific unit of images, obtained based on the luminance signal component or on the absolute level of the luminance signal component, to correct the chrominance gain, the chrominance signal component being corrected based on the corrected chrominance gain.

10. The apparatus according to claim 6, A further comprising the steps of:

detecting degree of change in the histogram data; and modifying the gradation correction curve into a linear curve when the degree of change corresponds to or larger than a specific value.

11. An apparatus for processing an input video signal comprising:

a first generator to generate histogram data which indicates distribution of each of a plurality of levels at which luminance signal components of the input video signal are divided from the lowest to the highest luminance level per specific unit of image;

a second generator to generate an expansion coefficient that indicates distribution of the luminance signal components of the histogram data over the plurality of levels, the expansion coefficient being smaller when the luminance signal components converge on a specific level and being larger when the luminance signal components diverge over the plurality of levels;

a producer to produce at least a first gain according to the expansion coefficient based on specific characteristics of the expansion coefficient that includes a first characteristic portion, a second characteristic portion and a third characteristic portion, the first gain becoming larger in the first characteristic portion as the expansion coefficient becomes larger in a range from the smallest expansion-coefficient level to a first expansion-coefficient level larger than the smallest expansion-coefficient level, the first gain being constant in the second characteristic portion in a range from the first expansion-coefficient level to a second expansion-coefficient level larger than the first expansion-coefficient level, and the first gain becoming smaller in the third characteristic portion as the expansion coefficient becomes larger in a range from the second expansion-coefficient level to the largest expansion-coefficient level larger than the second expansion-coefficient level;

a processor to process at least the first gain and the histogram data to produce a plural number of data for a gradation correction curve; and a gradation corrector to generate the gradation correction curve based on the plural number of data and correct the input video signal based on the gradation correction curve.

12. The apparatus according to claim 11, wherein the producer further produces a second gain exhibiting characteristic that starts to decrease at a given luminance level or higher, the processor processing at least the first gain, the second gain and the histogram data to produce the plural number of data.

13. The apparatus according to claim 12, further comprising a detector to obtain average luminance for each of a specified unit of images based on the luminance signal component, the second gain being produced based on the average luminance.

14. A method of processing an input video signal comprising the steps of:
generating histogram data which indicates distribution of each of a plurality of levels at which a luminance signal components of the input video signal is divided from the lowest to the highest luminance level per specific unit of image;
generating an expansion coefficient that indicates distribution of the luminance signal components of the histogram data over the plurality of levels, the expansion coefficient being smaller when the luminance signal components converge on a specific level and being larger when the luminance signal components diverge over the plurality of levels;
producing a first gain according to the expansion coefficient based on specific characteristics of the expansion coefficient that includes a first characteristic portion, a second characteristic portion and a third characteristic portion, the first gain becoming larger in the first characteristic portion as the expansion coefficient becomes larger in a range from the smallest expansion-coefficient level to a first expansion-coefficient level larger than the smallest expansion-coefficient level, the first gain being constant in the second characteristic portion in a range from the first expansion-coefficient level to a second expansion-coefficient level larger than the first expansion-coefficient level, and the first gain becoming smaller in the third characteristic portion as the expansion coefficient becomes larger in a range from the second expansion-coefficient level to the largest expansion-coefficient level larger than the second expansion-coefficient level;
producing at least a first gain based on the distribution of the histogram data;
processing at least the first gain and the histogram data to produce a plural number of data for a gradation correction curve;
generating the gradation correction curve based on the plural number of data; and
correcting the input video signal based on the gradation correction curve.

15. The method according to claim 14, wherein the producing step includes the step of producing a second gain exhibiting characteristic that starts to decrease at a given luminance level or higher, the processor processing at least the first gain, the second gain and the histogram data to produce the plural number of data.

16. The method according to claim 15, wherein the generating step includes the step of obtaining average luminance for each of a specific unit of images based on the luminance signal component, the second gain being produced based on the average luminance.

* * * * *